United States Patent [19]

Cutler, Jr. et al.

[11] Patent Number: 5,678,184
[45] Date of Patent: Oct. 14, 1997

[54] METHOD OF PRE-COMPUTATION OF CANDIDATE HANDOFF CELL LIST FOR CELLULAR COMMUNICATIONS

[75] Inventors: Victor Hawes Cutler, Jr., Mesa, Ariz.; Gerald Joseph Davieau, Eldersburg, Md.; Keith Andrew Olds, Mesa, Ariz.

[73] Assignee: Motorola, Inc., Schaumburg, Ill.

[21] Appl. No.: 431,006

[22] Filed: Apr. 28, 1995

[51] Int. Cl.⁶ .................................................. H04B 7/26
[52] U.S. Cl. .............................. 455/33.2; 455/13.1
[58] Field of Search .......................... 455/13.1, 13.2, 455/33.1, 33.2, 12.1; 342/357, 457

[56] References Cited

U.S. PATENT DOCUMENTS

| | | | |
|---|---|---|---|
| 4,728,959 | 3/1988 | Maloney | 342/457 |
| 5,483,664 | 1/1996 | Moritz et al. | 455/13.1 |
| 5,509,051 | 4/1996 | Barnett et al. | 379/59 |

*Primary Examiner*—Reinhard J. Eisenzopf
*Assistant Examiner*—Darnell R. Armstrong
*Attorney, Agent, or Firm*—Kevin K. Johanson; Sherry J. Whitney

[57] ABSTRACT

A satellite cellular communication system includes satellites in motion that project cells upon the surface of the Earth. These cells are in motion and pass over individual subscriber units (26) engaged in communications, thus requiring individual subscriber units (26) to perform handoffs as an active current cell (300) currently servicing them advances. Selection of a subsequent servicing cell requires evaluation of active neighboring cells. A pre-computation of candidate cells is performed in advance according to a cell activation schedule. Active neighboring cells of an active current cell (300) are evaluated and prioritized in advance of individual subscriber unit's need for them. A candidate handoff cell list is then delivered to a satellite (12). A candidate handoff cell list is broadcast to all individual subscriber units (26) located within active current cell (300) for use in handoff decisions.

17 Claims, 5 Drawing Sheets

METHOD OF PRE-COMPUTATION OF CANDIDATE HANDOFF CELL LIST FOR CELLULAR COMMUNICATIONS

The present invention is related to the following inventions:

(1) "Satellite Cellular Communication Methods for Performing Cell-To-Cell Handoff", having Ser. No. 08/252,472, filed Jun. 1, 1994, and assigned to the assignee of the present invention; and (2) "Communication System and Method Using Subscriber Units to Evaluate Handoff Candidates", Daniel Richard Tayloe, inventor, and assigned to the assignee of the present invention and filed on the same day as the present invention.

TECHNICAL FIELD

This invention relates generally to satellite cellular communications and, in particular, to methods of generating a candidate handoff cell list for use in performing cell-to-cell handoff between cells of the same satellite and between cells of different satellites.

BACKGROUND OF THE INVENTION

A cellular communication system projects a number of cells onto the Earth at diverse locations. A frequency spectrum is allocated in frequency, time, coding or a combination of these to the cells so that communications occurring in nearby cells use different channels to minimize the chances of interference. Communications taking place in cells located far apart may use the same channels, and the large distance between communications in common channels prevents interference. Over a large pattern of cells, a frequency spectrum is reused as much as possible by distributing common channels over the entire pattern so that only far apart cells reuse the same spectrum. An efficient use of spectrum results with no interference among the different communications.

One problem which cellular communication systems address is the handing-off of communications between cells. Relative movement between end users and cells causes the end users and the communication links directed thereto to move between cells. To permit continuous communications in an ongoing call, the system must "handoff" the call when the individual subscriber unit crosses a cell boundary. If a call is not handed-off to a new cell upon leaving the old cell, the call will eventually be lost or dropped because the strength of the signals significantly decreases so that the individual subscriber unit cannot receive the unit's transmissions, or visa versa.

The conventional handoff technique may work adequately when the distances between individual subscriber units and system transceivers are relatively small, when the speeds of movement between cells and subscriber units are slow, or when handoffs are relatively evenly distributed in time. Such conditions are present for conventional terrestrial cellular systems in which cells do not move with respect to the Earth and in which subscriber units move between cells according to conventional modes of transportation. On the other hand, when system radio equipment is located on satellites orbiting the Earth at high rates of speed, these conditions are not present and conventional handoff techniques are inadequate.

For example, orbiting satellites are located a relatively large distance from subscriber units, often on the order of several hundred kilometers. The smaller this distance, the greater the speed of the satellite relative to a particular position on the Earth. Speeds of over 20,000 km/hr are typical. This fast movement relative to a subscriber unit introduces widely and rapidly varying propagation delays and Doppler frequency offsets into signals transmitted between a satellite and an individual subscriber unit. The widely and rapidly varying propagation delays and Doppler frequency offsets make the acquisition and monitoring of signals a difficult and time consuming task, particularly when many different signals may be acquired. Moreover, the great speed of this movement may cause handoffs to occur much more frequently than in conventional cellular systems. For these types of systems not only does the cell pattern move, but its configuration changes with time; cell shutdown occurs so as to maintain channel separation. This leads to another form of imposed handoff.

Conventional cellular communications systems address the handoff problem by monitoring and comparing signal strength of the mobile units at the fixed base stations. A currently used channel senses a degeneration of signal quality and begins searching a spectrum of frequencies for a signal having improved qualities. Such an unsophisticated selection process is adequate for terrestrial systems with relatively low handoff rates, but in consumes excessive time and system resources such as loss of bandwidth and power in a system with high handoff dynamics.

Some more advanced systems use fixed-frequency/fixed-cell search techniques to discover a candidate cell and frequency. This technique is limited by constellation dynamics as adjacent orbits converge causing cell overlap and redundant coverage. For efficiency concerns, redundant coverage cells are disabled to conserve power. This reconfiguration of system resources limits the effectiveness of fixed-frequency/fixed-cell techniques.

Other advanced systems allow an individual subscriber unit to initiate the handoff process based on local conditions. These systems use regularly updated dynamic candidate handoff cell lists from which the subscribers make unit handoff decisions. Communication system components cognizant of changing constellation dynamics generate dynamic candidate handoff cell lists. These dynamic lists reflect cell activation and deactivation as discussed above. Such dynamic candidate handoff cell lists overcome many of the shortcomings of stale lists of candidate handoff cells. In a highly dynamic system such as a satellites cellular system, it is desirable to regulate the handoff process to manage the dynamics and prevent an individual subscriber unit from making poor handoff decisions based on temporary conditions.

Accordingly, there is a significant need for generating candidate handoff cell lists reflecting the dynamics of a communication system. Further, there is a need to generate a candidate handoff cell list to regulate the handoff process. Such a method improves the efficiency of a system by providing candidate handoff cells having an increased likelihood of accommodating subscriber unit communications.

DESCRIPTION OF THE PREFERRED EMBODIMENTS

The present invention has utility in generating a candidate handoff cell list for use in handing-off calls or communication between cells of the same satellite and between cells served by different satellites. Handoff is initiated by an individual subscriber unit (ISU) based on local conditions. Once handoff is needed, the ISU chooses a candidate cell from a candidate handoff cell list. The candidate handoff list is provided to the ISU from the satellite. After selecting the candidate cell, the ISU requests handoff, handoff is performed and communication begins over the new traffic channel in the selected candidate handoff cell.

A "satellite" means a man-made object or vehicle intended to orbit a celestial body such as the Earth. The term "satellite" is intended to include both geostationary and orbiting satellites and/or combinations thereof including low-Earth orbiting (LEO) satellites. The word "Earth" is intended to include any celestial body around which a communication satellite may orbit. A "constellation" means an ensemble of satellites arranged in orbits for providing specified coverage (e.g., radio communication, photogrammetry, etc.) of portion(s) or all of the celestial body. A constellation typically includes multiple rings (or planes) of satellites and may have equal numbers of satellites in each plane, although this is not essential. The terms "cell", "beam", and "antenna pattern" are not intended to be limited to any particular mode of generation and include those created by either terrestrial or satellite cellular communication systems and/or combinations thereof.

Figure 1:
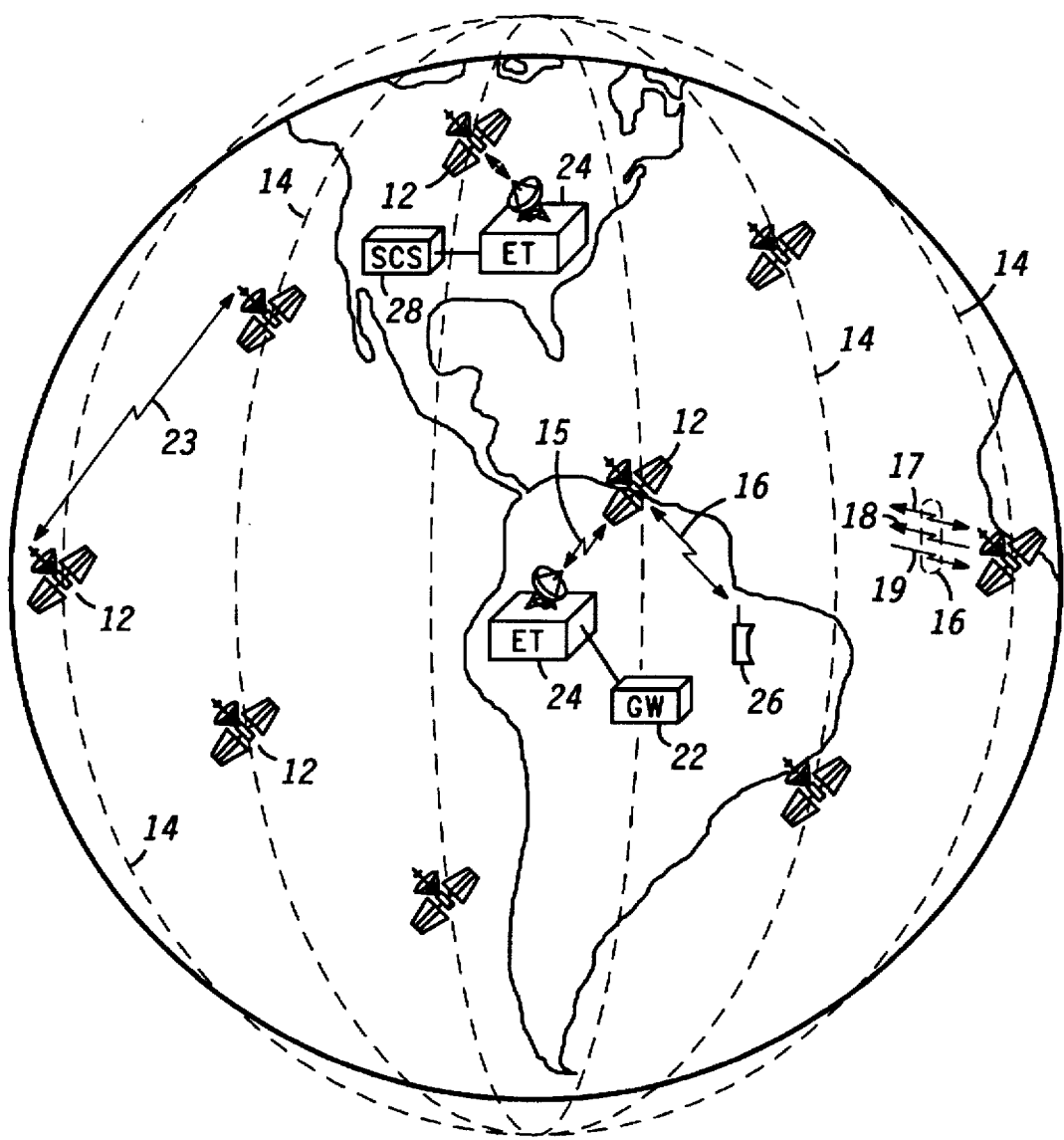
FIG. 1 depicts a highly simplified diagram of a satellite-based cellular communication system of which the present invention may form a portion thereof.

FIG. 1 illustrates a highly simplified diagram of satellite-based cellular communication system 10, dispersed over and surrounding Earth through use of orbiting satellites 12 occupying orbits 14. The present invention is applicable to communication systems including satellites having low-Earth and medium-Earth orbits. Additionally, it is applicable to orbits having any angle of inclination (e.g., polar, equatorial or another orbital pattern).

Communication system 10 uses six polar orbits 14, with each orbit 14 having eleven satellites 12 for a total of sixty-six satellites 12. Although this is preferred, it is not essential because more or fewer satellites, or more or fewer orbits, may be used. While the present invention is advantageously employed when a large number of satellites are being used, it is also applicable with as few as a single satellite. For clarity, FIG. 1 illustrates only a few of satellites 12 of the constellation.

For example, each orbit 14 encircles Earth at an altitude of around 780 km, although higher or lower orbital altitudes may be usefully employed. Due to the relatively low orbits of satellites 12, substantially line-of-sight electromagnetic (e.g., radio, light etc.) transmission from any one satellite 12 or reception of signals by any one satellite 12 covers a relatively small area of Earth at any instant. For the example shown, satellites 12 travel with respect to Earth at around 25,000 km/hr, allowing satellite 12 to be visible to a terrestrial station or ISU's 26 for a period of approximately nine minutes.

Satellites 12 communicate with terrestrial stations which may include some number of radio communication individual subscriber units (ISU's) 26 and earth terminals (ET's) 24 connected to system control segment (SCS) 28. ET's 24 may also be connected to gateways (GW's) 22 which provide access to a public switched telephone network (PSTN) or other communications facilities. Only one each of GW's 22, SCS's 28 and ISU's 26 are shown in FIG. 1 for clarity and ease of understanding. ET's 24 may be co-located with or separate from SCS 28 or GW 22. ET's 24 associated with SCS's 28 receive data describing tracking of satellites 12 and relay packets of control information while ET's 24 associated with GW's 22 only relay data packets (e.g., relating to calls in progress).

ISU's 26 may be located anywhere on the surface of the Earth or in the atmosphere above the Earth. ISU's 26 are preferably communications devices capable of transmitting data to and receiving data from satellites 12. By way of example, ISU's 26 may be a handheld, portable cellular telephones adapted to communicate with satellites 12. Ordinarily, ISU's 26 need not perform any control functions for communication system 10.

Communication system 10 may accommodate any number, potentially in the millions, of ISU's 26. In the preferred embodiments of the present invention, ISU's 26 communicate with nearby satellites 12 via subscriber links 16. Links 16 encompass a limited portion of the electromagnetic spectrum that is divided into numerous channels. Links 16 are preferably combinations of L-Band frequency channels and may encompass Frequency Division Multiple Access (FDMA) and/or Time Division Multiple Access (TDMA) and/or Code Division Multiple Access (CDMA) communications or combination thereof.

At a minimum, satellite 12 regularly transmits over one or more broadcast channels 18. ISU's 26 synchronize to broadcast channels 18 and monitor broadcast channels 18 to detect data messages which may be addressed to specific ISUs 26 or broadcast generally to all ISUs 26 within that specific cell. The broadcast channel is downlink channel used by satellite 12 to transmit data to ISUs 26. It also provides a frequency and timing reference to the ISUs 26. Satellite 12 transmits a unique candidate handoff cell list or modifications of that list to all ISUs 26 in that cell. This candidate handoff cell list may provide alternative and preferred listing of candidate handoff cells. ISU's 26 may transmit messages to satellites 12 over one or more acquisition channels 19. Broadcast channels 18 and acquisition channels 19 are not dedicated to any one ISU 26 but are shared by all ISU's 26 currently within view of a satellite 12.

On the other hand, traffic channels 17 are two-way channels that are assigned to particular ISU's 26 by satellites 12 from time to time. In the preferred embodiment of the present invention, a digital format is used to communicate data over channels 17-19, and traffic channels 17 support real-time communications. At least one traffic channel 17 is assigned for each call, and each traffic channel 17 has sufficient bandwidth to support, at a minimum, a two-way voice conversation along with associated control data such as candidate handoff cell list modifications. To support real-time communications, a time division multiple access (TDMA) scheme is desirably used to divide time into frames, preferably in the 10–90 millisecond range. Particular traffic channels 17 are assigned particular transmit and receive time-slots, preferably having durations in the 3–10 millisecond range, within each frame. Analog audio signals are digitized so that an entire frame's signal is transmitted or received in a single short high speed burst during an allotted time-slot. Preferably, each satellite 12 supports up to a thousand or more traffic channels 17 so that each satellite 12 can simultaneously service a number of independent calls. Those skilled in the art, however, will recognize that traffic channels can be formed without this time slot structure and that methods that do not require digitizing the analog voice signal may be employed. The precise method used to form the channels and process the voice communication is not important to this invention.

Satellites 12 communicate with other nearby satellites 12 through cross-links 23. Thus, a call or communication from an ISU 26 located at any point on or near the surface of the Earth may be routed through the constellation of satellites 12 to within range of substantially any other point on the surface of the Earth. A communication may be routed down to an ISU 26 on or near the surface of the Earth from a satellite 12 using subscriber link 16. Alternatively, a communication may be routed down to or up from any of many ET's 24, of which FIG. 1 shows only two, through earth links 15. ET's 24 are usually distributed over the surface of the Earth in accordance with geo-political boundaries. In the preferred embodiments, each satellite 12 may communicate with up to four ET's 24 and over a thousand ISU's 26 at any given instant.

SCS 28 monitors the health and status of system communication nodes (e.g., GW's 22, ET's 24 and satellites 12) and desirably manages operations of communication system 10. One or more ET's 24 provide the primary communications interface between SCS 28 and satellites 12. ET's 24 include antennas and RF transceivers and preferably perform telemetry, tracking and control functions for the constellation of satellites 12.

GW's 22 may perform call processing functions in conjunction with satellites 12 or GW's 22 may exclusively handle call processing and allocation of call handling capacity within communication system 10. Diverse terrestrial-based communication systems, such as the PSTN, may access communication system 10 through GW's 22.

With the example constellation of sixty-six satellites 12, at least one of satellites 12 is within view of each point on the Earth's surface at all times, resulting in full coverage of the Earth's surface. Any satellite 12 may be in direct or indirect data communication with any ISU 26 or ET 24 at any time by routing data through the constellation of satellites 12. Accordingly, communication system 10 may establish a communication path for relaying data through the constellation of satellites 12 between any two ISU's 26, between SCS 28 and GW 22, between any two GW's 22 or between ISU 26 and GW 22.

The present invention is also applicable to satellite constellations where full coverage of the Earth is not achieved (i.e., where there are "holes" in the communications coverage provided by the constellation) and constellations where plural coverage of portions of the Earth occur (i.e., more than one satellite is in view of a point on the Earth's surface).

In general terms, communication system 10 may be viewed as a network of nodes. Each satellite 12, GW 22, and ISU 26 represents a node of communication system 10. All nodes of communication system 10 are or may be in data communication with other nodes of communication system 10 through communication links 15, 16, and/or 23. In addition, all nodes of communication system 10 are or may be in data communication with other telephonic devices dispersed throughout the world through PSTNs and/or conventional terrestrial cellular telephone devices coupled to the PSTN through conventional terrestrial base stations.

Figure 2:
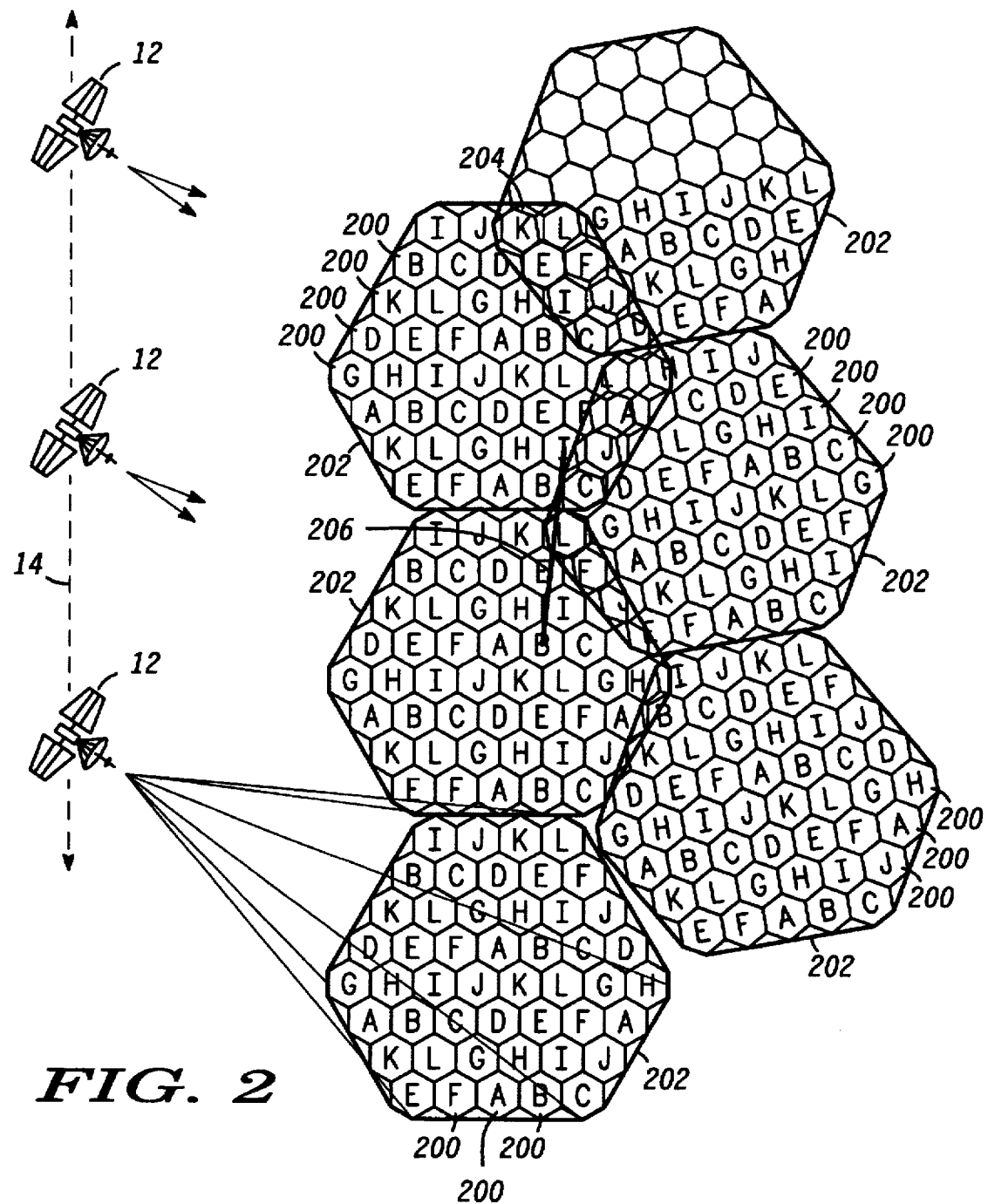
FIG. 2 graphically depicts relative orientations between footprints of cells which may be generated by a satellite-based communication system.

FIG. 2 shows a static layout diagram of an exemplary cellular antenna pattern achieved by six of satellites 12, wherein three of the six satellites are sequentially positioned in one orbit 14 and another three of the six satellites 12 are sequentially positioned in an adjacent orbit 14. For clarity, FIG. 2 depicts only the first three of these six satellites 12.

Each satellite 12 includes an array (not shown) of directional antennas. Each array projects numerous discrete antenna patterns on the Earth's surface at numerous diverse angles away from its satellite 12. FIG. 2 shows a schematic diagram of a resulting pattern of cells 200 that satellites 12 collectively form on the surface of the Earth. With satellites 12 positioned at 780 km above the Earth, cells 200 may have a diameter generally in the 400–800 km range. With satellites 12 traveling at speeds of up to 25,000 km/hr with respect to the Earth, cells 200 also travel over the Earth close to this speed, and any given point on the surface of the Earth resides within a single cell 200 for no more than around one minute. Regardless of any movement relative to the Earth by ISUs 26 (see FIG. 1), communication system 10 may expect to engage in an extensive number of handoffs, and many calls will experience at least one and quite possibly many more handoffs.

The pattern of cells 200 which a single satellite 12 projects on the Earth's surface is referred to as a footprint 202. FIG. 2 depicts footprints 202 as each having forty-eight cells 200. However, the precise number of cells 200 included in a footprint 202 is unimportant for the purposes of the present invention. FIG. 2 further illustrates an overlap 204 which results from the convergence of orbits 14. The size of overlap 204 varies in response to the location of the overlapping footprints 202. As can be determined by reference to FIGS. 1–2, the greatest amount of overlap 204 occurs in the polar regions of the Earth while little or no overlap occurs in the equatorial regions of the Earth. FIG. 2 represents a static snap-shot of footprints 202. The portion of overlap 204 which is associated with any two adjacent cross planar footprints 202 changes as satellites 12 move within orbits 14.

Communication system 10, defines each cell 200 generated from the operation of a constellation of satellites 12 as being either active or inactive. Active cells may be viewed as being turned "on" while inactive cells may be viewed as being turned "off". Inactive cells 200 reside in overlap region 204, and cells 200 are dynamically switched to active and inactive states as satellites 12 orbit the Earth. Any cell 200 which is not declared as being inactive is defined to be active. Satellites 12 refrain from broadcasting transmissions within inactive cells 200, and any signals received at satellites 12 from inactive cells 200 are ignored.

Generally speaking, the active or inactive nature of cells 200 is determined by first simulating the positions of cells 200 with respect to the Earth at a particular point in time. Of course the simulation may be repeated for other points in time to track movement of the constellation of satellites 12. The cell position data may be calculated by applying conventional trigonometric techniques to orbital and antenna geometries. In particular, the cells' positions may be determined from the orbits' positions, the satellites' speed, orbits' distances from the Earth, and angles of displacement for various beams supported by the satellites' antennas away from the satellites' Nadir directions. The cell position data may desirably describe the location of the center of each cell 200 on the surface of the Earth.

Once cell positions have been simulated, these positions may be analyzed to assign active and inactive status indications to the cells 200. For example, the distances between the center of each cell 200 and the centers of all other cells 200 may be compared with a predetermined distance. When the distance between two of cells 200 is less than this predetermined distance or threshold, an overlap is declared between the two cells. In the preferred embodiment, an overlap is declared when at least 70% of two cells 200 occupy the same area. One of the two cells 200 is then assigned an inactive status to cure the overlap. Generally, a cell 200 located toward the outer region of its footprint 202 is assigned an inactive status rather than an overlapping cell 200 located closer to the center region of its footprint 202.

The cell position simulation and assignment process is repeated numerous times to determine when particular cells 200 go active and inactive. Once cells 200 have been assigned active and inactive statuses for particular durations, the cell activation schedule are communicated to satellites 12 as commands so that cells 200 may actually be turned on and off as indicated by the cell status data.

For convenience, FIG. 2 illustrates cells 200 and footprints 202 as being discrete, generally hexagonal shapes without overlap or gaps, other than those attributed to the convergence of orbits 14 near the polar regions of the Earth and the divergence of orbits 14 near the equatorial regions of the Earth. However, those skilled in the art will understand that in actual practice equal strength lines projected from the antennas of satellites 12 may be more circular or elliptic than hexagonal, that antenna side lobes may distort the pattern, and that some preferably minor overlap between adjacent cells 200 may be expected.

While a preferred orbital geometry for a constellation of satellites 12 has been described herein, those skilled in the art will appreciate that the communication nodes which satellites 12 provide for communication system 10 need not be positioned precisely as described herein. For example, such nodes may be located on the surface of the Earth or in orbits other than those described herein. Likewise, the precise number of nodes may vary from network to network.

A constellation of satellites 12 communicates with all of ISUs 26 (see FIG. 1) using a limited amount of the electromagnetic spectrum. The precise parameters of this spectrum are unimportant to the present invention and may vary from network to network. The present invention divides this spectrum into discrete portions, hereinafter referred to as channel sets. Satellites 12 transmit/receive signals to/from active cells using channel sets assigned to the respective active cells. The precise manner of dividing this spectrum is also unimportant to the present invention. For example, the spectrum may be divided into discrete frequency bands, discrete time slots, discrete coding techniques, or a combination of these. Desirably, each of these discrete channel sets is orthogonal to all other channel sets or at least orthogonal to channels in adjacent cells. In other words, simultaneous communications may take place at a common location over every channel in every channel set without significant interference.

Likewise, the precise number of channel sets into which the spectrum is divided is not important to the present invention. FIG. 2 illustrates an exemplary assignment of twelve discrete channel sets to active cells 200. FIG. 2 references the twelve discrete channel sets through the use of the characters "A", "B", "C", "D", "E", "F", "G", "H", "I", "J", "K", and "L". Those skilled in the art will appreciate that a different number of channel sets may be used and that, if a different number is used, the resulting assignment pattern of channel sets to active cells 200 will differ from the assignment pattern depicted in FIG. 2. Likewise, those skilled in the art will appreciate that each channel set may include one channel or any number of orthogonal channels therein, and that nothing requires different channel sets to include the same number of channels therein.

Figure 3:
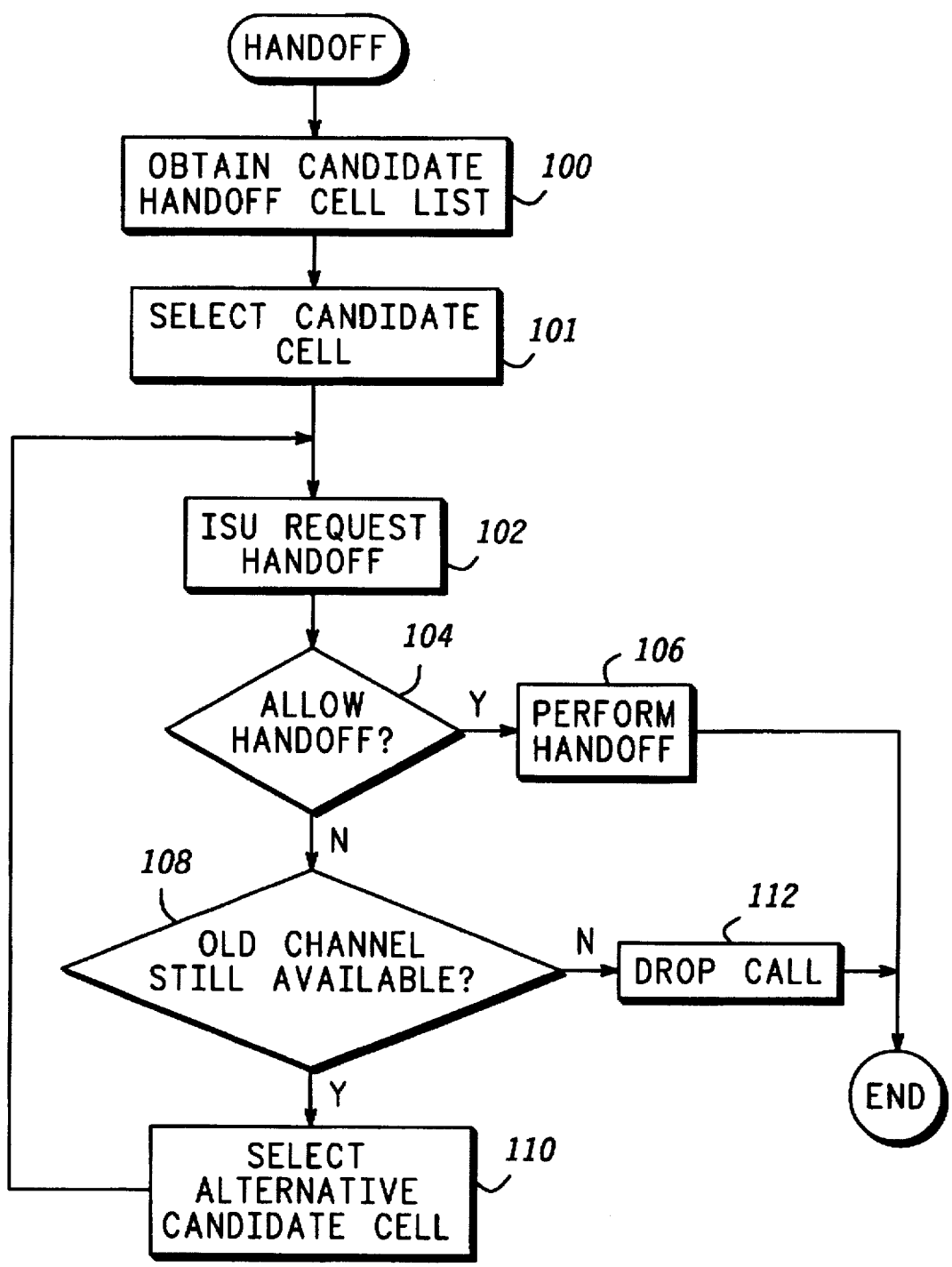
FIG. 3 illustrates a high-level handoff procedure for handing-off communications from one cell to another cell in accordance with a preferred embodiment of the present invention.

FIG. 3 illustrates a high-level handoff procedure for handing-off communications from one cell to another cell in accordance with a preferred embodiment of the present invention. The FIG. 3 handoff procedure is used for handing-off calls or communications from one cell of one satellite to another cell of the same satellite (intra-satellite handoff) and for handing-off communications from one cell of a first satellite to another cell of a second satellite (inter-satellite handoff).

According to FIG. 3, an ISU 26 and a satellite 12 servicing ISU 26 prepare in step 100 for handoff. Step 100 may include other steps such as determining whether handoff is to occur and selecting a candidate handoff cell for handing-off communication. Communication system 10 allows various classes of ISUs 26 to use different methods for determining the need for handoff. The baseline for a voice ISU 26 is differential power. Other methods may use location of ISU 26 on the Earth and combined power and Doppler shift. Basically, any technique that can be performed independently by ISU 26 can be used.

In step 100, ISU 26 monitors broadcast channel 18 associated with the cell presently servicing ISU 26. A pre-computed candidate handoff cell list is periodically transmitted from the satellite to the ISU using broadcast channel 18 associated with the particular cell presently servicing ISU 26. A candidate handoff cell list comprises channel identification (time and frequency) of broadcast channels 18 for potential cells that are candidate cells into which ISU 26 may transfer communications during the next handoff. A candidate handoff cell list is pre-computed by the method of FIGS. 4 and 5, in accordance with a preferred embodiment of the present invention and delivered to each satellite 12 for transmission in each satellite's respective broadcast channels 18.

In step 101, an ISU 26 selects a candidate handoff cell from a candidate handoff cell list received in step 100. This selection by ISU 26 may be random or elaborate depending on the specific sophistication of an ISU 26. In the present invention, entries in a candidate handoff cell list are prioritized according to selection criteria as described in FIG. 5.

In step 102 of FIG. 3, ISU 26 requests satellite 12 presently servicing the ISU to handoff communication from the active current cell to a candidate cell. When handoff occurs between two cells served by the same satellite, control information is passed between the ISU and the satellite without interruption of mission traffic and no requirement for network involvement. Handoff between cells on different satellites 12 may require a short interruption of mission traffic. When conditions permit, voice detection allows handoffs of this type to occur during periods of no voice activity.

After the handoff request is received by satellite 12 in step 102, satellite 12 determines in step 104 whether the handoff request will be accepted. If handoff is permitted, satellite 12 performs in step 106 the intra-satellite or inter-satellite handoff. A handoff will generally involve a change in the subscriber radio link channel assignment. This requires ISU 26 to resynchronize to the new traffic channel assignment.

If the handoff request is denied in step 104, satellite 12 informs ISU 26 and determines in step 108 whether the old channel is still available. If the old traffic channel is still available. ISU 26 selects an alternative candidate cell in step 110 and returns to step 104 to determine whether satellite 12 will permit handoff to the alternative candidate cell. This continues until the handoff request is accepted and the handoff is performed, or until the channel in the original cell can no longer be maintained and the call is dropped in step 112. If satellite 12 does not handoff communication to the candidate cell before ISU 26 leaves the active current cell, ISU 26's communication will be terminated and the call dropped. Dropping a call in step 112 may be either intentional (the call being disconnected before satellite 12 is out of range) or unintentional (the call being disconnected because satellite 12 goes out of range of ISU 26).

Each time ISU 26 hands-off to a different cell, it monitors a different broadcast channel 18 associated with that cell. This new broadcast channel 18, as with previous broadcast channel 18, transmits a candidate handoff cell list unique to the cell presently servicing ISU 26.

Figure 4:
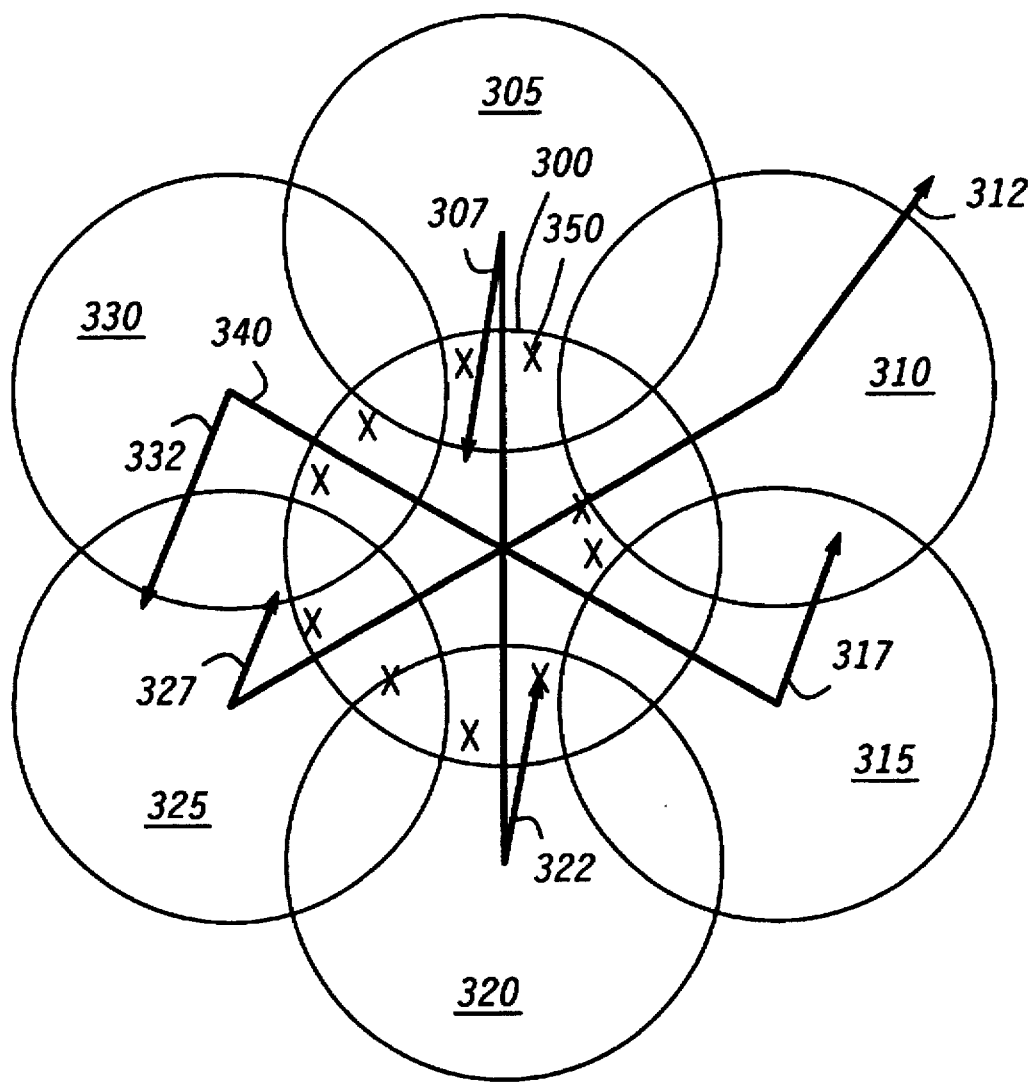
FIG. 4 depicts a projection of cells from various sources upon a surface such as the Earth, and depiction of analysis of those cells, in accordance with a preferred embodiment of the present invention.

FIG. 4 depicts a projection of cells from various sources upon a surface such as the Earth, and depiction of analysis of those cells, in accordance with a preferred embodiment of the present invention. FIG. 4 graphically depicts computations performed in pre-computing at SCS 28 a candidate handoff cell list for use by ISU 26 in evaluating handoff alternatives. This depiction illustrates an active current cell 300 which is the present cell providing service to ISU 26.

A candidate handoff cell list includes only cells that are calculated to be suitable candidates for handoff. In particular, cells will not be included if they are about to be shut down, even if the current geometry would seem to make them a good candidate for handoff from active current cell 300. When satellites 12 approach either of the poles, candidate cells of satellites 12 begin to form overlap 204 (FIG. 2). This means that one of satellites 12 will have to turn off cells and corresponding channels so that interference will not be caused between two active, overlapping cells. Moreover, calls will be transferred from satellites 12 whose cells are being turned off to satellite 12 whose cells remain turned on.

A candidate handoff cell list is generated in advance by SCS 28 shown in FIG. 1. SCS 28 may predict the candidate cells into which ISU 26 may handoff by predicting the future geometric relationship between cells and by referencing a cell activation schedule. It may also consider factors such as the position of the counter-rotating seam of the constellation of satellites and expected communication link load dynamics. SCS 28 transfers the time-sequenced candidate handoff cell list for each cell served by satellite 12 to each of satellites 12 which in turn transmit the appropriate list in their broadcast channel 18 to ISUs 26.

A candidate handoff cell list is relatively static for cells near the center of satellite footprint 202. For cells near the edge of satellite footprint 202, the candidate handoff cell list is more dynamic. For cells near the counter-rotating seam (area where satellites traveling in opposite directions pass each other), a candidate handoff cell list is very dynamic.

In FIG. 4, an active current cell 300 depicts a present servicing cell from which ISU 26 is attempting to handoff. From a cell activation schedule generated by SCS 28, active neighboring cells to active current cell 300 may be determined. These active neighboring cells may be projected from the same satellite 12 or from various adjacent satellites 12 both moving in the same or opposite direction, in the preferred embodiment.

As various satellites 12 continue in orbits 14, the combination of active neighboring satellites changes. A generated candidate handoff cell list therefore has a fixed period for which they are valid. Subsequent lists are generated and in the preferred embodiment, schedules comprising hours or days worth candidate handoff cell lists are generated and delivered to satellites 12 in advance.

In calculating a particular candidate handoff cell list, a cell activation schedule generated by SCS 28 is retrieved to establish which cells will be active during the validity period of the particular candidate handoff cell list being calculated. In FIG. 4, active current cell 300 is surrounded by active neighboring cells 305, 310, 315, 320, 325, and 330.

Active neighboring cells 305, 310, 315, 320, 325, and 330 are shown to overlap active current cell 300. For pre-computation of a candidate handoff cell list, these overlaps may be characterized either empirically by stored test data describing the "footprint" of the various cells as projected by a satellite 12, or they may be approximated as representative of a satellite antenna pattern.

One of the screening steps in the pre-computation of a candidate handoff cell list comprises calculating signal quality at perimeter locations 350 of active current cell 300 that coincide with active neighboring cells 305, 310, 315, 320, 325, and 330. This calculation allows neighboring cells having insufficient signal quality to be screened out early in the selection process and not cause an undue burden on an ISU to evaluate an inferior active neighboring cell.

Furthermore, each active neighboring cell inherently possesses a velocity vector corresponding to its orbital direction. Velocity vectors 307, 312, 317, 322, 327, and 332 correspond to active neighboring cells 305, 310, 315, 320, 325, and 330, respectively. Active neighboring cells 315, 320, and 325 are depicted as being projected from the same satellite 12, and active neighboring cells 305 and 330 are also shown as being projected from a different satellite 12. Also, active neighboring cell 310 is shown as being projected from a separate satellite 12.

Also, various current cell vectors 340 are generated and shown extending from the center of active current cell 300 to each of the centers of active neighboring cells 305, 310, 315, 320, 325, and 330. Current cell vector 340 is used in evaluation and prioritization of active neighboring cells. The angle formed by current cell vector 340 and a corresponding velocity vector is used in screening out active neighboring cells that are undesirably moving away from the area serviced by active current cell 300.

Figure 5:
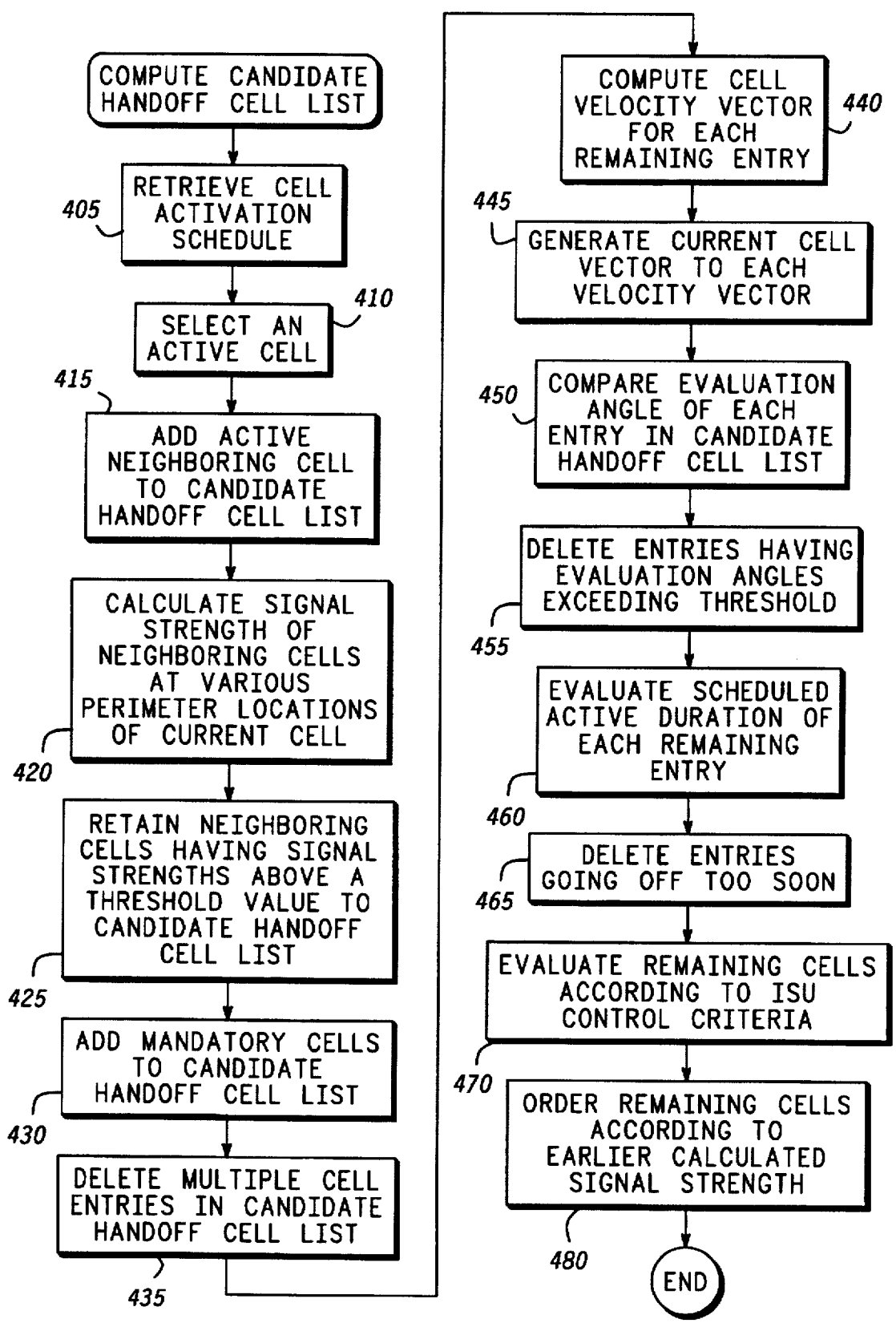
FIG. 5 shows a flowchart for pre-computation of a candidate handoff cell list, in accordance with a preferred embodiment of the present invention.

FIG. 5 shows a flowchart for pre-computation of a candidate handoff cell list, in accordance with a preferred embodiment of the present invention. This pre-computation improves the performance of ISUs 26 by calculating and prioritizing beforehand the most likely handoff candidates and providing them in a list to ISU 26.

In computing a candidate handoff cell list, a step 405 is first performed. Step 405 retrieves a cell activation schedule describing a cell activation plan for either all satellites in a constellation or a small subset currently being processed. SCS 28 may perform the generation of a candidate handoff cell list as part of its constellation management, and in the preferred embodiment, a candidate handoff cell list and a cell activation schedule governing satellites 12 activation of cells are both generated and integrated to provide a satellite cell management plan covering multiple hours and even days worth of management data.

A step 410 selects an active cell from the cell activation schedule. Candidate handoff cell lists are only generated for active cells. ISUs located within the view of an inactive cell would be serviced by an active overlapping cell providing its own candidate handoff cell list to ISU 26. In the preferred embodiment, a candidate handoff cell list is generated for each active cell in a cell activation schedule.

A step 415 adds active neighboring cells to a candidate handoff cell list for active current cell 300. Active neighboring cells 305, 310, 315, 320, 325, and 330 are known from the cell activation schedule.

A step 420 calculates a signal quality for various perimeter locations 350 located at the fringe of active current cell 300 and in the overlapping areas of active neighboring cells 305, 310, 315, 320, 325, and 330. Signal quality calculations of a perimeter signal strength may be based on several different calculation techniques such as stored antenna gain characteristics for satellite antennas, or other methods such as an integration of overlapping areas corresponding to gain contours. Calculated signal quality data are stored with the respective active neighboring cells for subsequent evaluation.

Step 425 screens the calculated signal quality data calculated in step 420 and discriminates on the basis of a signal quality threshold. Those active neighboring cells having insufficient signal quality are removed from the candidate handoff cell list.

A step 430 adds cells known as mandatory cells to the candidate handoff cell list. Mandatory cells are those that are projected by the same satellite as active current cell 300. Mandatory cells are expressly added to the candidate handoff cell list because intra-satellite handoffs are preferred as the handoff overhead process may be performed entirely by satellite 12. Some removed active neighboring cells from step 425 may be added back onto the candidate handoff cell list as mandatory if they are projected by the same satellite 12 as active current cell 300. Mandatory cells are assigned maximum signal quality values for subsequent evaluation.

A step 435 deletes multiple cell entries in the candidate handoff cell list. Multiple entries may have arisen when a cell was both an initial active neighboring cell and a mandatory cell or from multiple signal quality calculations for an active neighboring cell in step 420. The cell entries having the inferior signal quality value are deleted from the candidate handoff cell list.

Each entry in the candidate handoff cell list represents a cell projected by orbiting satellite 12. From orbital dynamics models, it is possible to calculate velocity vectors for projected cells. A step 440 computes a velocity vector for each of these entries in the candidate handoff cell list. Velocity vectors 307, 312, 317, 322, 327, and 332 convey information such as active neighboring cells 305, 310, 315, 320, 325, and 330 direction with respect to active current cell 300.

A step 445 generates a current cell vector 340 from a central location of active current cell 300 to the center of the cell of each of the entries in the candidate handoff cell list. The angle formed by joining a current cell vector 340 and a velocity vector corresponding to a cell in the candidate handoff cell list is evaluated in step 450.

Step 450 compares the evaluation angle formed in step 445 to a threshold value. Only evaluation angles that are acute, those less than about 90 degrees, represent cells that are moving toward active current cell 300. The threshold value may be varied depending upon several factors one of which may be the amount of overlap between active current cell 300 and active neighboring cells.

However, if an ISU 26 in active current cell 300 is shadowed by terrestrial obstructions, handing-off communications to a parallel cell having overlap may provide improved signal quality over that available in active current cell 300. In the preferred embodiment, an evaluation angle threshold of about 100 degrees is employed, however, threshold values may vary depending on predicted terrestrial obstructions (e.g., urban structures or mountainous terrain), attenuation characteristics, or other factors. A step 455 then removes entries from the candidate handoff cell list that exhibit evaluation angles greater that the threshold value.

A step 460 evaluates the scheduled active duration of each of the remaining entries on the candidate handoff cell list by referencing the cell activation schedule which lists cells that are active for the interval covered by the cell activation schedule. If an entry in the candidate handoff cell list is scheduled to go inactive within a handoff threshold value, a step 465 removes the entry from the candidate handoff cell list.

A step 470 evaluates remaining entries in the candidate handoff cell list according to control criteria for individual subscriber units. The candidate handoff cell list is evaluated for entries that, in the preferred embodiment of a polar orbit satellite constellation, will be projected by adjacent satellites traveling in the opposite direction of the satellite projecting active current cell 300. These oppositely orbiting adjacent satellites create a counter-rotating seam between these planes of satellites. Handing communications off between cells projected by opposingly orbiting satellites may create a very short-lived handoff of communications because of the rotation of the Earth inside of this constellation. If an individual subscriber unit handed-off to a counter-rotating cell in the direction opposite to the rotation of the Earth, the individual subscriber unit would shortly have to handoff back across this seam. If such oppositely-traveling entries are in the candidate handoff cell list, those entries are further evaluated to determine if such an entry opposes the rotation of the Earth in relation to active current cell 300. Opposing entries are very inefficient handoff candidates and may either be stricken from the candidate handoff cell list or given a very low priority.

A step 480 prioritizes the remaining entries in the candidate handoff cell list. This prioritization is based upon signal qualities either calculated earlier in step 420 or assigned to mandatory cells in step 430. Step 480 may also prioritize the remaining entries using stored location data corresponding to a specific ISU 26. In this alternate embodiment, an SCS would retrieve stored location data corresponding to a specific ISU and transpose the ISU location data onto active current cell 300. Prioritization would then continue with ordering of the remaining entries relating more specifically to the location of an ISU. This ISU-specific candidate handoff cell list would then be identified with an ISU-specific identifier when broadcast in the broadcast channel. ISUs located within that broadcast channel that did not have that identifier, would disregard that particular candidate handoff cell list and listen for a generic candidate handoff cell list or for a candidate handoff cell list specific to them.

Prioritizing entries in the candidate handoff cell list that are broadcast to ISUs 26 residing in active current cell 300 allows handoffs to be performed more efficiently since analysis that would be distributed to ISUs 26 in a less sophisticated system, have been previously performed before an ISU 26 receives a candidate handoff cell list.

In summary, the present invention provides a method for performing pre-computation of handoff candidates for a cellular communication system. Pre-computation localizes what would be repetitive distributed real-time computations delaying handoff decisions in subscriber units. Pre-computing candidate handoff cell list and providing that list to an ISU prevents exhaustive searching of all possible broadcast channels in identifying adjacent candidate cells.

The present invention has been described above with reference to a preferred embodiment. However, those skilled in the art will recognize that changes and modifications may be made in this preferred embodiment without departing from the scope of the present invention.

What is claimed is:

1. A method of generating a candidate handoff cell list for controlling an individual subscriber unit in performing handoff determination in a cellular communication system, said method comprising:

selecting an active current cell for which said candidate handoff cell list will be generated, said active current cell being a servicing cell from which said individual subscriber unit would desirably handoff communications;

adding a plurality of active neighboring cells to said candidate handoff cell list, said plurality of active neighboring cells being entries to said candidate handoff cell list;

generating a velocity vector for each of said entries of said candidate handoff cell list;

comparing an evaluation angle formed by each of said velocity vectors with said active current cell for each of said entries of said candidate handoff cell list; and deleting said entries of said candidate handoff cell list wherein said evaluation angle exceeds a threshold value.

2. A method as recited in claim 1, wherein said selecting step further comprises retrieving a cell activation schedule for said active current cell.

3. A method as recited in claim 1, further comprising the steps of:

calculating at a perimeter of said active current cell, a perimeter signal strength for each of said entries of said candidate handoff cell list, said perimeter signal strength being utilized in said evaluating step; and prioritizing said entries remaining in said candidate handoff cell list.

4. A method as recited in claim 3, further comprising the step of adding mandatory cells to said candidate handoff cell list prior to said prioritizing step, said mandatory cells being cells projected from a same location as said active current cell.

5. A method as recited in claim 4, wherein said mandatory cells are assigned maximum signal quality values for use in said prioritizing step.

6. A method as recited in claim 4, wherein said adding step further comprises the step of deleting inferior redundant entries in said candidate handoff cell list.

7. A method as recited in claim 1, wherein said comparing step further comprises the steps of:

receiving a location of one of said individual subscriber units within said active current cell prior to said comparing step; and offsetting said evaluation angle to said location of one of said individual subscriber units prior to said comparing step.

8. A method as recited in claim 4, wherein said prioritizing step further comprises the steps of:

evaluating a scheduled active-duration for each of said entries of said candidate handoff cell list, said scheduled active-duration being a scheduled remaining duration for which said entries are scheduled to remain active; and deleting said entries of said candidate handoff cell list wherein said scheduled active-duration is less than a duration threshold.

9. A method as recited in claim 8, wherein said prioritizing step further comprises the steps of:

evaluating an orbital direction of said entries with respect to said active current cell;

for said entries having said orbital direction opposing said active current cell, evaluating a rotational direction of said entries with respect to the Earth; and for said entries having said rotational direction opposing the rotation of the Earth, deleting said entries from said candidate handoff cell list.

10. A method as recited in claim 4, wherein said prioritizing step comprises the step of ordering said entries of said candidate handoff cell list according to said calculated signal quality.

11. A method as recited in claim 4, wherein said same location is an orbiting satellite.

12. A method of generating a candidate handoff cell list for use by an individual subscriber unit in a satellite cellular communication system wherein said satellite cellular communication system comprises a plurality of orbiting satellites wherein each of said plurality of orbiting satellites projects a plurality of cells upon the Earth, said plurality of cells being in motion with respect to the Earth, said plurality of cells being operative according to a cell activation schedule, said motion requiring said individual subscriber unit to perform a handoff from a first cell to a second cell, said method comprising the steps of:

retrieving said cell activation schedule;

selecting an active current cell for which to generate a candidate handoff cell list, said active current cell corresponding to said first cell;

adding a plurality of active neighboring cells to said candidate handoff cell list, said plurality of active neighboring cells being entries to said candidate handoff cell list, said active neighboring cells being adjacent or nearby said active current cell and said active neighboring cells being scheduled to be operative according to said cell activation schedule;

generating a velocity vector for each of said entries of said candidate handoff cell list;

comparing an evaluation angle formed by each of said velocity vectors with said active current cell for each of said entries of said candidate handoff cell list; and deleting said entries of said candidate handoff cell list wherein said evaluation angle exceeds a threshold value.

13. A method as recited in claim 12, further comprising the steps of:

calculating at a perimeter of said active current cell, a perimeter signal strength for each of said entries of said candidate handoff cell list; and prioritizing said entries remaining in said candidate handoff cell list.

14. A method as recited in claim 13, further comprising the steps of:

adding mandatory cells to said candidate handoff cell list prior to said prioritizing step, said mandatory cells being cells projected from a same location as said active current cell;

assigning maximum evaluation values to said mandatory cells for use in said prioritizing step; and deleting inferior redundant entries in said candidate handoff cell list.

15. A method as recited in claim 12, wherein said comparing step further comprises the steps of:

evaluating a scheduled active-duration for each of said entries of said candidate handoff cell list, said scheduled active-duration being a scheduled remaining duration for which said entries are scheduled to remain active; and deleting said entries of said candidate handoff cell list wherein said scheduled active-duration is less than a duration threshold.

16. A method of managing a satellite cellular communication system comprising a plurality of orbiting satellites wherein each of said plurality of orbiting satellites projects a plurality of cells upon the Earth, as said plurality of orbiting satellites converge while orbiting, said plurality of cells of said plurality of orbiting satellites overlaps others of said plurality of cells, said method comprising the steps of:

generating at a gateway a cell activation schedule defining a plurality of active current cells, said plurality of active current cells being comprised of said plurality of cells of said plurality of orbiting satellites that are not overlapped by others of said plurality of cells and some of said plurality of cells that are overlapped by others of said plurality of cells;

generating a velocity vector for each of said entries of said candidate handoff cell list;

comparing an evaluation angle formed by each of said velocity vectors with said active current cell for each of said entries of said candidate handoff cell list;

deleting said entries of said candidate handoff cell list wherein said evaluation angle exceeds a threshold value;

delivering said cell activation schedule and said candidate handoff cell list to said plurality of orbiting satellites;

activating, at said plurality of orbiting satellites, said plurality of active current cells according to said cell activation schedule;

transmitting said candidate handoff cell list corresponding to each of said plurality of active current cells to a plurality of individual subscriber units located in each of said plurality of active current cells;

receiving at said plurality of individual subscriber units, said candidate handoff cell list; and said plurality of individual subscriber units employing said candidate handoff cell list in handoff decisions as said plurality of active current cells continue in motion with respect to said plurality of individual subscriber units.

17. A method as recited in claim 16, further comprising the steps of:

adding a plurality of active neighboring cells as entries to said candidate handoff cell list, said active neighboring cells being adjacent or nearby said active current cell and said active neighboring cells being scheduled to be operative according to said cell activation schedule;

evaluating each of said entries of said candidate handoff cell list according to a calculated signal quality of each of said entries;

deleting said entries of said candidate handoff cell list wherein said calculated signal quality of said entries fall below a signal quality threshold; and prioritizing said entries remaining in said candidate handoff cell list.

\* \* \* \* \*